United States Patent [19]
Davidson et al.

[11] Patent Number: 6,041,243
[45] Date of Patent: Mar. 21, 2000

[54] PERSONAL COMMUNICATIONS UNIT

[75] Inventors: Steven Frederic Davidson, Skoki; Kim David Vollendorf, Cary; Michael Frank DiCicco, Carol Stream; Stuart John Collar, Algonquin; Jeffrey Jay Stone, North Barrington, all of Ill.

[73] Assignee: Northrop Grumman Corporation, Los Angeles, Calif.

[21] Appl. No.: 09/079,655

[22] Filed: May 15, 1998

[51] Int. Cl.[7] .................................................... H04B 1/38
[52] U.S. Cl. ......................... 455/575; 455/557; 455/351; 455/90; 455/568
[58] Field of Search ............................... 455/90, 575, 345, 455/346, 347, 350, 369, 569, 550, 556, 568, 95, 344, 351, 557

[56] References Cited

U.S. PATENT DOCUMENTS

| | | |
|---|---|---|
| D. 265,402 | 7/1982 | Fukushima et al. . |
| D. 267,249 | 12/1982 | Fukushima et al. . |
| D. 298,242 | 10/1988 | Watanabe . |
| D. 309,136 | 7/1990 | Siddoway . |
| D. 339,128 | 9/1993 | Claxton et al. . |
| D. 368,711 | 4/1996 | Wicks et al. . |
| D. 378,678 | 4/1997 | Tyneski et al. . |
| D. 378,816 | 4/1997 | Hino . |
| D. 383,745 | 9/1997 | Lindeman et al. . |
| D. 384,059 | 9/1997 | Hockenberry et al. . |
| D. 385,269 | 10/1997 | Kim . |
| D. 385,270 | 10/1997 | Yahaya . |
| D. 393,260 | 4/1998 | Yahaya . |
| D. 393,638 | 4/1998 | Page et al. . |
| 3,916,312 | 10/1975 | Campbell . |
| 3,917,372 | 11/1975 | Selinko . |
| 4,025,721 | 5/1977 | Groupe et al. . |
| 4,031,468 | 6/1977 | Ziebell et al. . |
| 4,052,568 | 10/1977 | Janowski . |
| 4,156,797 | 5/1979 | Hoole . |
| 4,227,258 | 10/1980 | Root et al. . |
| 4,277,645 | 7/1981 | May, Jr. . |
| 4,325,142 | 4/1982 | Nakazawa ............................... 455/346 |
| 4,374,301 | 2/1983 | Jrieder, Jr. . |
| 4,417,102 | 11/1983 | Allen . |
| 4,484,344 | 11/1984 | Mai et al. . |
| 4,621,373 | 11/1986 | Hodsdon . |
| 4,625,083 | 11/1986 | Poikela . |
| 4,627,107 | 12/1986 | Hohlfeld et al. . |
| 4,654,882 | 3/1987 | Ikeda . |
| 4,682,367 | 7/1987 | Childress et al. . |
| 4,734,049 | 3/1988 | George et al. . |
| 4,754,484 | 6/1988 | Larkin et al. . |
| 4,761,823 | 8/1988 | Fier . |
| 4,876,724 | 10/1989 | Suzuki ..................................... 455/90 |
| 4,882,745 | 11/1989 | Silver ...................................... 455/90 |
| 4,882,746 | 11/1989 | Shimada . |
| 4,903,325 | 2/1990 | Yoshitake et al. . |
| 4,905,272 | 2/1990 | Van de Mortel et al. . |
| 4,955,050 | 9/1990 | Yamauchi . |
| 4,993,065 | 2/1991 | Chiou . |
| 5,020,090 | 5/1991 | Morris . |
| 5,023,936 | 6/1991 | Szczutkowski et al. . |

(List continued on next page.)

*Primary Examiner*—Doris H. To
*Attorney, Agent, or Firm*—Terry J. Anderson; Karl J. Hoch, Jr.

[57] ABSTRACT

A personal communications unit facilitates both wired and wireless communications with a wired intercom. The personal communications unit has a headset, an intercom connection cable placeable in electrical communication with the wired headset and also placeable in electrical communication with the wired intercom, a radio transceiver which is placeable in electrical communication with the headset, and a switching circuit which is configured to place the intercom connection cable in electrical communication with the headset when the intercom connection cable is in electrical communication with the wired intercom and which is configured to place the radio transceiver in electrical communication with the headset when the intercom connection cable is not in electrical communication with the headset. Wired communications with the wire intercom are facilitated when the intercom connection cable is connected to the wired intercom and wireless communications with the wired intercom are facilitated when the intercom connection cable is disconnected from the wired intercom.

19 Claims, 4 Drawing Sheets

U.S. PATENT DOCUMENTS

| | | | |
|---|---|---|---|
| 5,038,400 | 8/1991 | Bracat et al. | 455/349 |
| 5,081,641 | 1/1992 | Kotzin et al. . | |
| 5,086,510 | 2/1992 | Guenther et al. | 455/347 |
| 5,093,929 | 3/1992 | Stolarczyk et al. | 455/90 |
| 5,101,504 | 3/1992 | Lenz | 455/90 |
| 5,121,391 | 6/1992 | Paneth et al. . | |
| 5,121,504 | 6/1992 | Toko . | |
| 5,128,959 | 7/1992 | Bruckert . | |
| 5,133,001 | 7/1992 | Bohm. . | |
| 5,140,628 | 8/1992 | Murata et al. . | |
| 5,170,494 | 12/1992 | Levanto . | |
| 5,189,358 | 2/1993 | Tomura et al. . | |
| 5,191,593 | 3/1993 | McDonald et al. . | |
| 5,193,217 | 3/1993 | Lunn et al. . | |
| 5,230,016 | 7/1993 | Yasuda . | |
| 5,230,080 | 7/1993 | Fabre et al. . | |
| 5,247,567 | 9/1993 | Hirano . | |
| 5,255,308 | 10/1993 | Hashimoto et al. . | |
| 5,259,017 | 11/1993 | Langmantel . | |
| 5,259,020 | 11/1993 | Hirano . | |
| 5,261,121 | 11/1993 | Hashimoto . | |
| 5,263,047 | 11/1993 | Kotzin et al. . | |
| 5,265,150 | 11/1993 | Helmkamp et al. . | |
| 5,274,634 | 12/1993 | Babiarz . | |
| 5,276,680 | 1/1994 | Messenger . | |
| 5,276,765 | 1/1994 | Freeman et al. . | |
| 5,283,806 | 2/1994 | Dartois et al. . | |
| 5,283,817 | 2/1994 | Hara et al. . | |
| 5,293,588 | 3/1994 | Satoh et al. . | |
| 5,297,142 | 3/1994 | Paggeot et al. . | |
| 5,305,467 | 4/1994 | Herndon et al. . | |
| 5,325,419 | 6/1994 | Connolly et al. . | |
| 5,353,331 | 10/1994 | Emery et al. . | |
| 5,365,572 | 11/1994 | Saegusa et al. . | |
| 5,390,233 | 2/1995 | Jensen et al. . | |
| 5,406,615 | 4/1995 | Miller, II et al. . | |
| 5,408,496 | 4/1995 | Ritz et al. . | |
| 5,410,632 | 4/1995 | Hong et al. . | |
| 5,410,737 | 4/1995 | Jones . | |
| 5,416,828 | 5/1995 | Hiramatsu et al. . | |
| 5,440,613 | 8/1995 | Fuentes . | |
| 5,442,659 | 8/1995 | Bauchot et al. . | |
| 5,446,769 | 8/1995 | Shaver et al. . | |
| 5,448,757 | 9/1995 | Hirata . | |
| 5,459,814 | 10/1995 | Gupta et al. . | |
| 5,465,401 | 11/1995 | Thompson . | |
| 5,469,496 | 11/1995 | Emery et al. . | |
| 5,471,503 | 11/1995 | Altmaier et al. . | |
| 5,481,591 | 1/1996 | Suzuki . | |
| 5,487,175 | 1/1996 | Bayley et al. . | |
| 5,487,182 | 1/1996 | Hansson | 455/349 |
| 5,493,703 | 2/1996 | Yamashita . | |
| 5,504,803 | 4/1996 | Yamada et al. . | |
| 5,506,887 | 4/1996 | Emery et al. . | |
| 5,509,053 | 4/1996 | Gowda et al. . | |
| 5,509,406 | 4/1996 | Kock et al. . | |
| 5,513,248 | 4/1996 | Evans et al. . | |
| 5,519,763 | 5/1996 | Namekawa et al. . | |
| 5,533,097 | 7/1996 | Crane et al. . | |
| 5,555,448 | 9/1996 | Thiede et al. . | |
| 5,568,536 | 10/1996 | Tiller et al. . | |
| 5,574,775 | 11/1996 | Miller, II et al. . | |
| 5,579,535 | 11/1996 | Orlen et al. . | |
| 5,590,406 | 12/1996 | Bayley et al. . | |
| 5,590,417 | 12/1996 | Rydbeck . | |
| 5,594,777 | 1/1997 | Makkonen et al. . | |
| 5,594,952 | 1/1997 | Virtuoso et al. . | |
| 5,596,333 | 1/1997 | Bruckert . | |
| 5,602,843 | 2/1997 | Gray . | |
| 5,603,081 | 2/1997 | Raith et al. . | |
| 5,606,560 | 2/1997 | Malek et al. . | |
| 5,610,972 | 3/1997 | Emery et al. . | |
| 5,619,493 | 4/1997 | Ritz et al. . | |
| 5,619,553 | 4/1997 | Young et al. . | |
| 5,625,673 | 4/1997 | Grewe et al. . | |
| 5,625,877 | 4/1997 | Dunn et al. . | |
| 5,633,911 | 5/1997 | Han et al. . | |
| 5,640,689 | 6/1997 | Rossi . | |
| 5,649,055 | 7/1997 | Gupta et al. . | |
| 5,655,621 | 8/1997 | Yamashita et al. . | |
| 5,657,375 | 8/1997 | Connolly et al. . | |
| 5,657,422 | 8/1997 | Janiszewski et al. . | |
| 5,659,594 | 8/1997 | Toda . | |
| 5,659,882 | 8/1997 | Fukutomi . | |
| 5,659,890 | 8/1997 | Hidaka . | |
| 5,664,005 | 9/1997 | Emery et al. . | |
| 5,675,629 | 10/1997 | Raffel et al. . | |
| 5,701,356 | 12/1997 | Stanford et al. | 455/90 |
| 5,771,303 | 6/1998 | Mazzarella et al. | 455/90 |
| 5,774,793 | 6/1998 | Cooper et al. . | |
| 5,793,855 | 8/1998 | Peck | 455/90 |
| 5,839,919 | 11/1998 | Chen | 455/90 |
| 5,850,613 | 12/1998 | Bullecks | 455/90 |
| 5,884,198 | 3/1999 | Kese et al. | 455/90 |

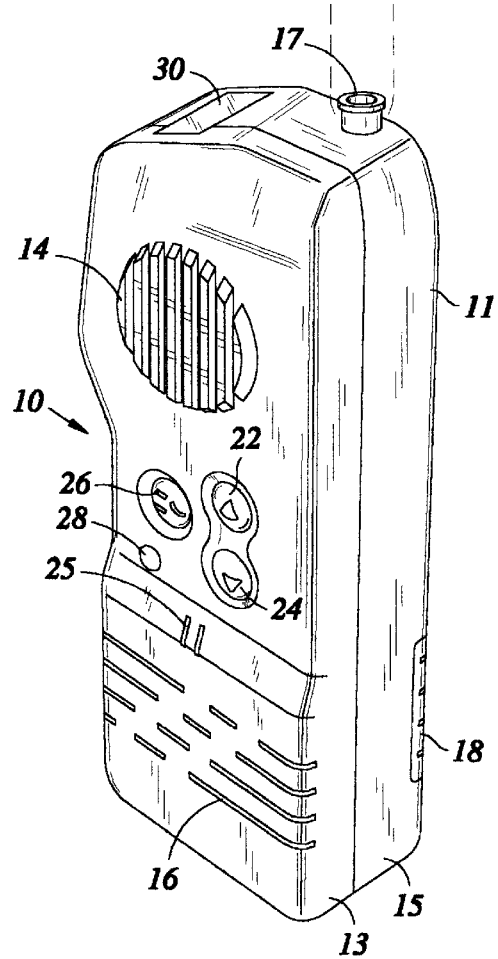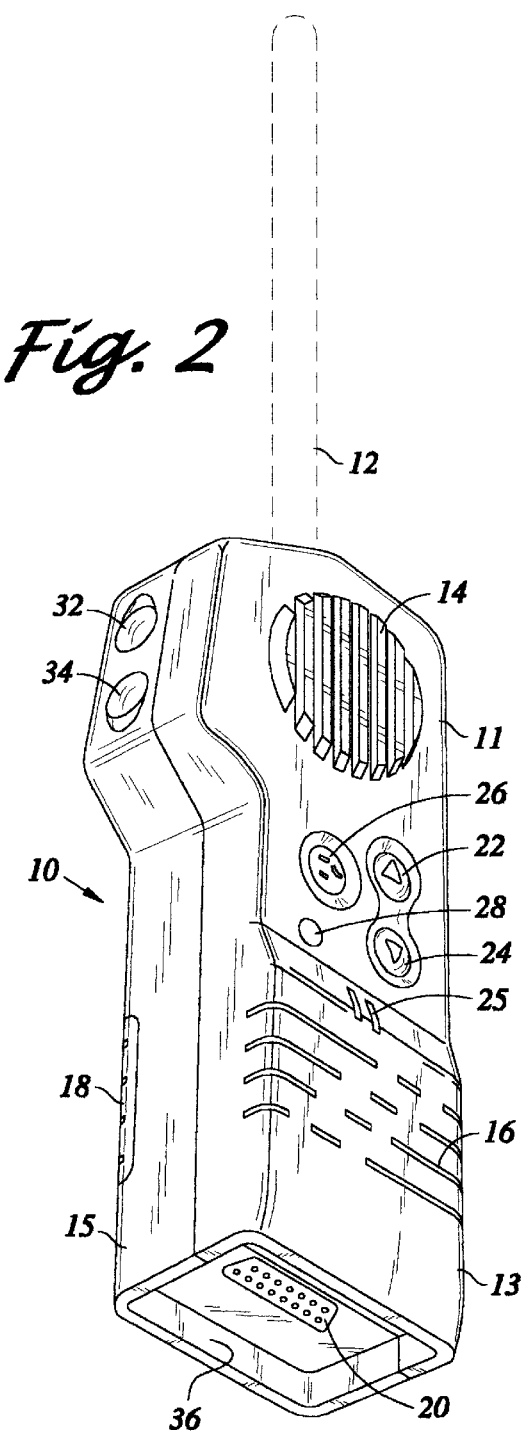

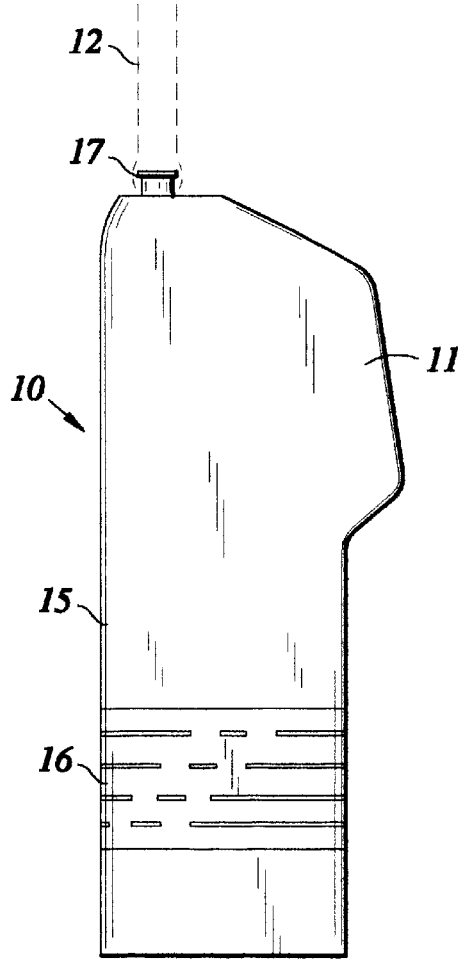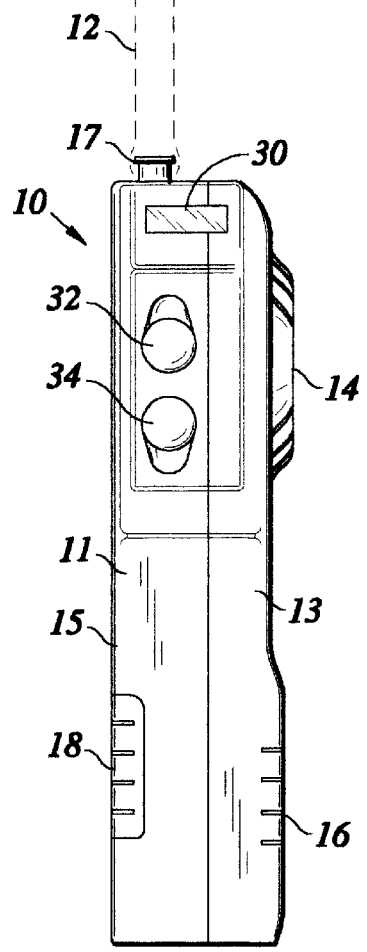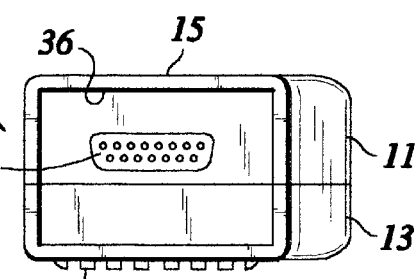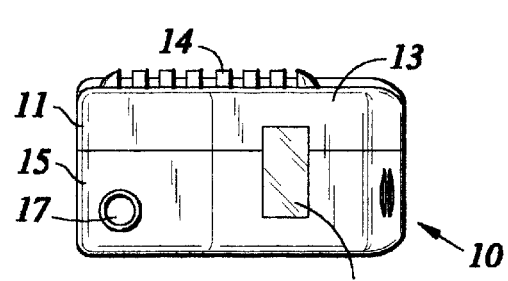

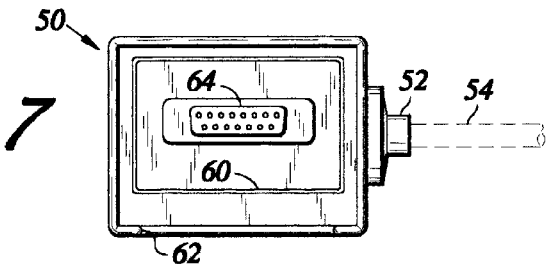
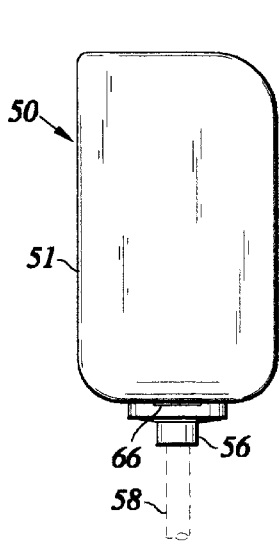
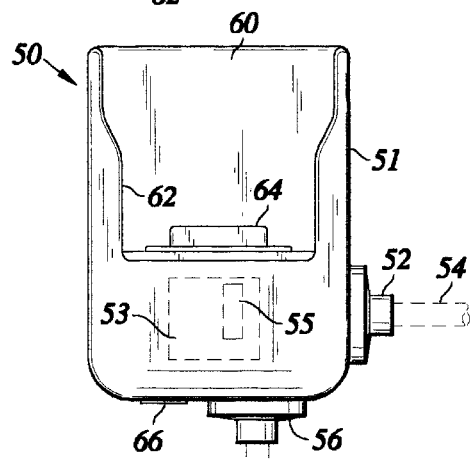
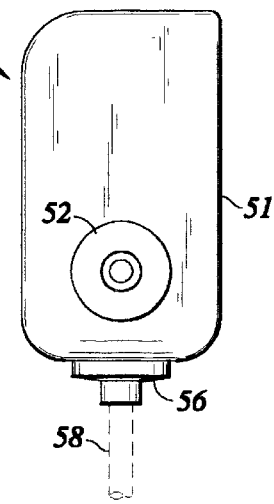
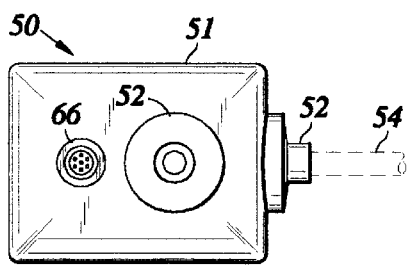
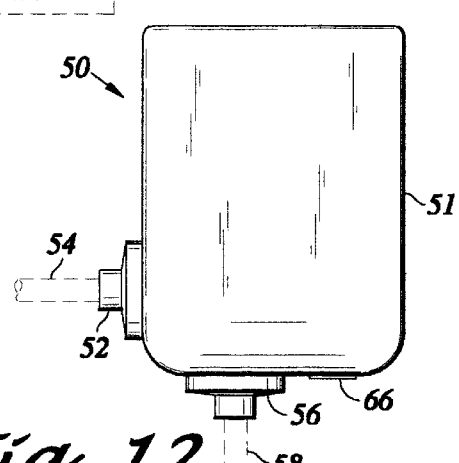

PERSONAL COMMUNICATIONS UNIT

Related Applications

This patent application incorporates by reference the contents of U.S. patent application Ser. No. 09/079,774, filed on even date herewith, and entitled COMMUNICATIONS INTERFACE ADAPTER.

FIELD OF THE INVENTION

The present invention relates generally to telecommunications and more particularly to a personal communications unit for facilitating both wired and wireless communications with a wired intercom.

BACKGROUND OF THE INVENTION

Wired intercoms for facilitating communications between crew members of military vehicles such as tanks and armored personnel carriers are well known. Such contemporary wired intercom systems comprise a wired communications system within the vehicle itself, as well as headsets which must be worn by the crew members and plugged into the wired intercom system of the vehicle.

However, those skilled in the art will appreciate that such wired intercom systems possess the inherent limitation of being unusable by a crew member who is physically disconnected, i.e., not plugged into, the wired intercom system of the vehicle. Thus, when it is necessary for a crew member to bail out or leave the vehicle, that crew member can no longer communicate directly with the vehicle's wired intercom system according to such contemporary technology.

In an effort to mitigate the problems associated with bailing out of a vehicle, crew members may be provided with two-way walkie-talkies or radio transceivers. However, as those skilled in the art further will appreciate, such radio transceivers do not communicate directly with the wired intercom system of the vehicle, but rather communicate only with a radio transceiver of the vehicle, typically operated by a radioman or other crew member. Thus, direct communications with the entire crew is not maintained when a person outside of the vehicle communicates via such a radio transceiver.

Those skilled in the art will further appreciate that it is sometimes important for the crew member who has left the vehicle to communicate directly to a member of the crew other than the radioman or other crew member who is operating a radio transceiver within the vehicle. For example, it may be important to tell the driver of the vehicle (who may not be operating the radio transceiver) that it is necessary to perform a particular maneuver in order to avoid damage to the vehicle and/or injury to the crew members. Thus, it will be appreciated that it is very desirable for such a member of the crew, who has left the vehicle, to remain in direct communication with all members of the crew of the vehicle.

Further, the use of such a radio transceiver necessitates that the crew member carry an additional piece of equipment, having additional weight, thereby contributing substantially to the overall weight load of the crew member. This may be very undesirable, particularly in instances wherein the crew member is expected to traverse large distances by foot.

In view of the foregoing, it is desirable to provide means for communicating with substantially the entire crew of a vehicle, such as a tank or armored personnel carrier, by a crew member who has bailed out or left the vehicle and has thus unplugged himself from the vehicle's wired communications system. It is further desirable that such means for communicating with the crew of the vehicle be lightweight, easy to use, and not cumbersome in design.

SUMMARY OF THE INVENTION

The present invention specifically addresses and alleviates the above mentioned deficiencies associated with the prior art. More particularly, the present invention comprises a personal communications unit for facilitating both wired and wireless communications with a wired intercom, such as that of a military vehicle. The personal communications unit of the present invention comprises a headset connection cable in electrical communication with the headset and an intercom connection cable placeable in electrical communication with the headset and also placeable in electrical communication with the wired intercom. A radio transceiver is also placeable in electrical communication with the headset. A switching circuit is configured to place the intercom connection cable in electrical communication with the headset when the intercom connection cable is in electrical communication with the wired intercom and is also configured to place the radio transceiver in electrical communication with the headset when the wired intercom is not in electrical communication with the headset.

Thus, according to the present invention, wired communications with the wired intercom of the vehicle are facilitated when the intercom connection cable is connected to e.g., plugged into, the wired intercom and wireless communications are facilitated when the intercom connection cable is disconnected from i.e., not plugged into, the wired intercom.

According to the preferred embodiment of the present invention, the intercom connection cable comprises a plug connector for placing the intercom connection cable in electrical communication with the wired intercom. The switching circuit preferably comprises a solid state switch for placing either the intercom connection cable or the radio transceiver in electrical communication with the headset.

The present invention preferably further comprises a docking station to which the headset and intercom connection cable are mechanically connected and to which the radio transceiver is removably mechanically connectable.

Thus, according to the preferred embodiment of the present invention, a personal communications unit for facilitating both wired and wireless communications with a wired intercom comprises a docking station having a first port for facilitating electrical communications with the headset and having a second port for facilitating electrical communications with the wired intercom; and also comprises a radio transceiver in electrical communication with the docking station. The radio transceiver is separable from the docking station so as to break electrical communication with the docking station. The radio transceiver may then be used autonomously.

Attachment of the radio transceiver to the docking station facilitates wired communications via the intercom connection cable and wired intercom. Attachment of the radio transceiver to the docking station facilitates radio communications with the radio transceiver when the wired intercom is not in electrical communication with the docking station. Separation of the radio transceiver from the docking station facilitates radio communications with the radio transceiver so as to enable the radio transceiver to be used autonomously.

The first and second ports of the docking station are preferably defined by cable connectors.

The docking station and the radio transceiver preferably comprise complementary electrical connectors for facilitating electrical communication therewith. The docking station and the radio transceiver preferably also comprise complementary mechanical connectors for facilitating mechanical attachment therebetween. Thus, according to the preferred embodiment of the present invention, the docking station and the radio transceiver comprise complementary electromechanical connectors for facilitating both electrical communication and mechanical attachment therebetween. In this manner, the radio transceiver and the docking station attached to one another so as to form a single unit, thereby placing the radio transceiver in electrical communication with the docking station.

The radio transceiver preferably comprises circuitry for cooperating with the docking station so as to facilitate communications via the wired intercom. The radio transceiver preferably comprises an amplifier circuit for cooperating with the docking station so as to facilitate communications via the wired intercom.

According to one preferred configuration of the present invention, the headset cable and the intercom connection cable are sewed or otherwise formed to a vest to which the docking station is attached. Thus, the docking station may be sewn into, for example, a pocket of the vest and the headset cable and the intercom cable sewn or otherwise formed into the vest such that they extend therefrom. The cables can then be constrained in the vest so as to not be caught or otherwise engaged with other equipment or hardware and imperil a crewman. Because of such construction, a crew member may easily discard the vest and the headset, and use only the radio transceiver for wireless communications with the crew members of the vehicle.

Further, according to the preferred embodiment of the present invention, the docking station comprises a guide for aligning the radio transceiver with the docking station, so as to facilitate mechanical and electrical interconnection of the docking station and the radio transceiver. The guide is preferably configured as a sleeve and is sized to receive at least a portion of the radio transceiver.

These as well as other advantages of the present invention will be more apparent from the following description and drawings. It is understood that the specific structure shown and described may be made within the scope of the claims without departing from the spirit of the invention.

BRIEF DESCRIPTION OF THE DRAWINGS

FIGS. 1 and 2 are perspective views of the radio transceiver of the present invention;

FIG. 3 is a side view of the radio transceiver of FIG. 1;

FIG. 4 is a rear view of the radio transceiver of FIG. 1;

FIG. 5 is a bottom view of the radio transceiver of FIG. 1;

FIG. 6 is a top view of the radio transceiver of FIG. 1;

FIG. 7 is a top view of the docking station of the present invention;

FIGS. 8 and 10 are opposite side views of the docking station of FIG. 7;

FIG. 9 is a front view of the docking station of FIG. 7;

FIG. 11 is a bottom view of the docking station of FIG. 7;

FIG. 12 is a rear view of the docking station of FIG. 7; and

DETAILED DESCRIPTION OF THE PREFERRED EMBODIMENT

Figure 13:
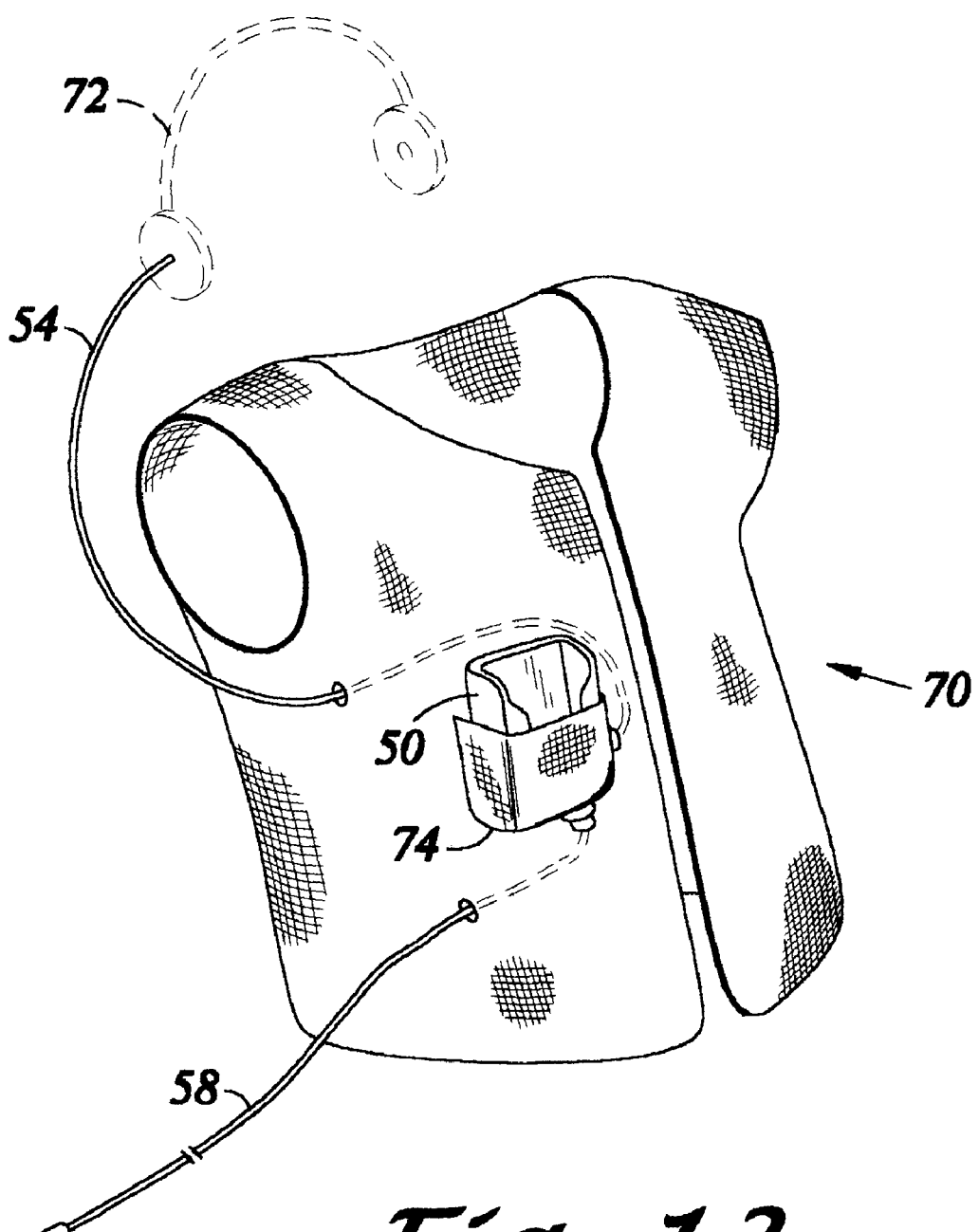
FIG. 13 is a perspective view of a vest having a docking station and its associated cables, i.e., the intercom connection cable and the headset cable built thereinto for easy removal and discarding thereof.

The detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The present invention is shown in FIGS. 1–13 which depict the presently preferred embodiment thereof. Referring now to FIGS. 1–6, the radio transceiver 10 of the personal communications unit of the present invention generally comprises a body or housing 11 which is preferably formed to comprise a front portion 13 and a rear portion 15 which snap or otherwise attach to one another in a generally clamshell-like fashion. A removable antenna 12 attaches to antenna connector 17, preferably at the top of the housing 11. A non-removable antenna may also be installed. A speaker 14 is disposed within the housing 11. A microphone 25 is disposed within the housing 11. A knurled, ridged, grooved, or otherwise made slip-resistant hand grip 16 preferably formed proximate the bottom of the housing 11 so as to facilitate secure holding or gripping thereof, particularly by a gloved hand.

A battery compartment cover 18 covers at least one battery within a battery compartment. The batteries are preferably rechargeable.

Electrical connector 20, preferably a 26 pin D-type connector, is disposed at the bottom of the housing 11 and facilitates electrical interconnection of the radio transceiver 10 to the docking station 50 (FIGS. 7–12).

Up selector pushbutton 22 and down selector pushbutton 24, in cooperation with mode pushbutton 26 and LED display 30 (which may alternatively be an LCD display), facilitate control or programming of the radio transceiver 10 for volume control, selection of battery charging mode, and such that it operates on the correct channel or frequency and communicates with either the wired intercom system (shown in FIG. 9) of a vehicle or the standard military SINCGARS or other radio system. Thus, the mode selector pushbutton 26 selects a variety of different modes of operation of the radio transceiver 10, such as channel selection, volume control, or battery charging mode, while the up selector pushbutton 22 and down selector pushbutton 24 select the particular channel and/or any other desired parameters relating to such communication.

On/off switch 28, which is preferably smaller than and more difficult to actuate than the other switches, facilitates activation and deactivation of the radio transceiver 10.

A first push-to-talk button 32, preferably disposed upon the side of the radio transceiver 10 so as to facilitate easy use thereof is depressed so as to effect communication with the standard military SINCGARS or other radio system. Similarly, a second push-to-talk button 34, preferably disposed proximate first push-to-talk button 32, facilitates communication with the vehicle wired intercom system.

A generally rectangular male mechanical mating connector 36 is configured so as to be received within complimentary female mechanical mating connector or sleeve 60 (FIG. 7 and 9) of the docking station, as discussed below.

Referring now to FIGS. 7 through 12, the docking station 50 of the personal communications unit of the present invention is shown. According to the preferred embodiment of the present invention, the docking station comprises a body or housing 51 which contains electrical connections for interfacing a headset, via cable 54, and strain relief end connector 52 to the wired intercom system via bail out cable or intercom connection cable 58 and its associated strain relief connector 56. The docking station 50 also facilitates electrical interface of the radio transceiver 10 to the wired intercom system of the vehicle via electrical connector 20 of the radio transceiver 10 and complimentary electrical connector 64 of the docking station 50. Electrical connector 64 is preferably a female electrical connector, such that any conductive debris dropped into the docking station 50 does not short the connector. As seen FIG. 9, the docking station 50 includes a switching circuit 53 disposed within the housing 51 thereof. The switching circuit 53 itself includes a solid state switch 55 for placing either the intercom connection cable 58 or the radio transceiver 10 in electrical communication with the headset 72. In this respect, the switching circuit 53 is configured to place the intercom connection cable 58 in electrical communication with the headset 72 when the intercom connection cable 58 is in electrical communication with the wired intercom system, and to place the radio transceiver 10 in electrical communication with the headset 72 when the wired intercom system is not in electrical communication with the headset 72.

Normally, communications between the vehicle's wired intercom system and the headset merely pass through radio transceiver 10 when it is electrically connected to the docking station 50 via connectors 20 and 64. The headset 72 is electrically connected to the docking station 50 via the connector terminated on cable 54 and the wired intercom system is electrically connected to the docking station 50 via the connector terminated on cable 58.

The body 51 of the docking station 50 preferably further comprises female guide member or sleeve 60 configured to receive the lower end or male guide member 36 of the radio transceiver 10 so as to facilitate proper alignment of the male connector 20 of the radio transceiver 10 with the female connector 64 of the docking station 50.

The sleeve 60 also facilitates easy connection of the radio transceiver 10 to the docking station 50, particularly when visibility is limited and/or the user is wearing heavy gloves. Sleeve 60 preferably comprises a cutout 62 formed therein so as to expose the ridges or otherwise roughened surface 16 of the radio transceiver 10, thereby making attachment and detachment of the radio transceiver 10 from a docking station 50 easier.

Digital communications port connector 66 facilitates the attachment of a personal computer or other digital communications device, e.g., target location and sighting device, GPS (Global Positioning Satellite) locator device, etc., to the docking station 50 so as to facilitate digital communications of the desired data.

Thus, in use, a crew member typically rides within a tank, armored personnel carrier, or other military vehicle with the radio transceiver 10 inserted into and electrically connected to the docking station 50. The crew member has the intercom connection cable 58 plugged into the wired intercom system of the vehicle and is wearing a headset attached to the docking station 50 via the headset cable 54. In this manner, the crew member is in wired communication with the rest of the vehicle crew (who are also plugged into the vehicle's wired intercom system, preferably via their own personal communications units). Those skilled in the art will appreciate that such wired communications is more reliable and provides better clarity, particularly within a metal vehicle, than wireless communications.

When it is necessary for the crew member to bail out or leave the vehicle, the crew member merely unplugs the bail out cable or intercom connection cable 58 from the vehicles wired intercom system.

Once outside the vehicle, the crew member may use his headset, which is connected to the radio transceiver 10 through the docking station 50, to communicate with either the vehicle's wired intercom system or with the standard military SINCGARS radio system, or with any other desired radio system for which the radio transceiver 10 has been programmed (is capable of transmitting on the frequency of).

The crew member may, optionally, disconnect the radio transceiver 10 from the docking station 50 and use the radio transceiver 10 in the manner of a conventional walkie-talkie, if desired. This allows the docking station 10, and the headset, as well as the headset cable 54, and the intercom connection cable 58 to be discarded. As those skilled in the art will appreciate, this reduction in weight is advantageous, particularly when the crew member may have to walk for an extended distance.

Referring now to FIG. 13, the docking station 50 may optionally be built or sewn into a vest 70 such that the intercom connection cable 58 and the headset cable 54 are sewn or formed into the lining thereof. Such incorporation of the docking station 50 into a vest 70 allows the crew member to easily discard the docking station 50, the intercom connection cable 58, and the headset 72 with its attached cable 54, by merely removing and discarding the vest 70. This configuration makes reduction in weight of the crew member substantially quicker and easier. This may be advantageous, particularly in battlefield situations. Alternatively, the docking station 50 may be optionally mounted in a pocket 74 which may be mounted on the belt of a crewman. Such incorporation of the docking station 50 in a pocket 74 allows the crew member to easily discard the docking station 50 to intercom connection cable 58, and the headset 72 with its attached cable 54, by merely removing and discarding the belt.

The personal communications unit described herein and shown in the drawings represents only a presently preferred embodiment of the invention. Indeed, various modifications and additions may be made to such embodiment without departing from the spirit and scope of the invention. For example, those skilled in the art will appreciate that the radio transceiver 10 and the docking station 50 may have various different physical configurations. It is only necessary that the radio transceiver 10 and the docking station 50 be easily placed in electrical communication with one another and easily detached from one another, when desired. Indeed, it is contemplated that the radio transceiver 10 and the docking station 50 may be electrically connected to one another via the use of a cable.

It is further contemplated that the present invention may find application in non-ground based vehicles such as aircraft and marine vehicles. Further, the present invention may find application in civilian vehicles, such as utilized by police, fire, and rescue personnel.

Thus, these and other modifications and additions may be obvious to those skilled in the art and may be implemented to adapt the present invention for use in a variety of different situations.

What is claimed is:

1. A personal communications unit for facilitating both wired and wireless communications with a wired intercom system, the personal communications unit comprising:

a) a headset cable for connection to a variety of headsets;
    b) an intercom connection cable placeable in electrical communication with the headset and placeable in electrical communication with the wired intercom system;
    c) a radio transceiver which is placeable into electrical communication with the headset;
    d) a switching circuit configured to place the intercom connection cable in electrical communication with the headset when the intercom connection cable is in electrical communication with the wired intercom system, and to place the radio transceiver in electrical communication with the headset when the intercom connection cable is not in electrical communication with the headset; and
    e) wherein wired communications with the wired intercom system are facilitated when the intercom connection cable is in electrical communication with the wired intercom system, and wireless communications with the wired intercom system are facilitated when the intercom connection cable is not in electrical communication with the wired intercom system.

2. The personal communications unit as recited in claim 1, wherein the intercom connection cable comprises a plug connector for placing the intercom connection cable in electrical communication with the wired intercom system.

3. The personal communications unit as recited in claim 1, wherein the switching circuit comprises a solid state switch for placing one of the intercom connection cable and the radio transceiver in electrical communication with the headset.

4. The personal communications unit as recited in claim 1, further comprising a docking station to which the headset and the intercom connection cables are electrically connected and to which the radio transceiver is removably mechanically connectable.

5. A personal communications unit for facilitating both wired and wireless communications with a wired intercom system, wired communications being performed utilizing a headset which is in electrical communication with the wired intercom system, the personal communications unit comprising:

a) a docking station station having a first port for facilitating electrical communication with the headset and a second port for facilitating electrical communication with the wired intercom system;
    b) a radio transceiver in electrical communication with the docking station, the radio transceiver being separable from the docking station so as to break electrical communication with the docking station;
    c) wherein attachment of the radio transceiver to the docking station facilitates one of wired and wireless communications between the headset and the wired intercom system, and separation of the radio transceiver from the docking station facilitates wireless communications between the radio transceiver and the wired intercom system.

6. The personal communications unit as recited in claim 5, wherein the first and second ports of the docking station are defined by cable connectors.

7. The personal communications unit as recited in claim 5, wherein the docking station and the radio transceiver comprise complimentary electrical connectors for facilitating electrical communication therebetween.

8. The personal communications unit as recited in claim 5, wherein the docking station and the radio transceiver comprise complimentary mechanical connectors for facilitating mechanical attachment therebetween.

9. The personal communications unit as recited in claim 5, wherein the docking station and the radio transceiver comprise complimentary electro mechanical connectors for facilitating both electrical communication and mechanical attachment therebetween.

10. The personal communications unit as recited in claim 5, wherein the radio transceiver and the docking station attach to one another so as to form a single unit, thereby placing the radio transceiver in electrical communication with the docking station.

11. The personal communications unit as recited in claim 5, wherein the radio transceiver comprises circuitry for cooperating with the docking station so as to facilitate communications via the wired intercom system.

12. The personal communications unit as recited in claim 5, wherein the radio transceiver comprises an amplifier circuit for cooperating with the docking station so as to facilitate communications via the wired intercom.

13. The personal communications unit as recited in claim 5, further comprising:

a) a headset cable;
    b) an intercom connection cable;
    c) a vest to which the docking station is attached and into which the headset cable and the intercom connection cable are extended;
    d) wherein a crew member may discard the vest and the headset, and then use the radio transceiver for wireless communications; and
    e) wherein the headset and intercom connection cables can be constrained, routed and located in the vest to prevent them from hampering movement of the crew member.

14. The personal communications unit as recited in claim 5, wherein the docking station comprises a guide for aligning the radio transceiver with the docking station so as to facilitate mechanical and electrical interconnection of the docking station and the radio transceiver.

15. The personal communications unit as recited in claim 5, wherein the docking station comprises a guide for aligning the radio transceiver with the docking station so as to facilitate mechanical and electrical interconnection of the docking station and the radio transceiver, the guide being configured as a sleeve sized to receive at least a portion of the radio transceiver.

16. A personal communications unit for facilitating both wired and wireless communications with a wired intercom system, the personal communications unit comprising:

a docking station configured to be placeable into electrical communication with a headset and the wired intercom system; and
    a radio transceiver releasably attached to the docking station, the radio transceiver being in electrical communication with the docking station when attached thereto;
    at least one of the docking station and the radio transceiver including circuitry operative to facilitate wired communications between the headset and the wired intercom system when the docking station is placed into electrical communication with the headset and the wired intercom system, wireless communications between the headset and the wired intercom system when the docking station is placed into electrical communication with only the headset, and wireless communications between the radio transceiver and the wired intercom system when the radio transceiver is detached from the docking station.

17. The personal communications unit of claims 16 further comprising:
   a headset cable electrically connected to the docking station for placing the docking station into electrical communication with the headset; and
   an intercom connection cable electrically connected to the docking station for placing the docking station into electrical communication with the wired intercom system.

18. A personal communications unit for facilitating both wired and wireless communications with a wired intercom system, the personal communications unit comprising:
   a docking station configured to be placeable into electrical communication with the wired intercom system;
   a headset electrically connected to the docking station;
   a radio transceiver releasably attached to and in electrical communication with the docking station;
   the docking station being operative to facilitate wired communications between the headset and the wired intercom system when placed into electrical communication with the wired intercom system, and wireless communications between the headset and the wired intercom system when not placed into electrical communication with the wired intercom system, with the radio transceiver being operative to facilitate wireless communications with the wired intercom system when detached from the docking station.

19. The personal communications unit of claim 18 further comprising:
   a headset cable electrically connected to the headset and the docking station; and
   an intercom connection cable electrically connected to the docking station for placing the docking station into electrical communication with the wired intercom system.

* * * * *